April 7, 1925.

S. W. CADY 1,533,059

TRACTION ACTUATED LIFT MECHANISM

Filed June 19, 1924  2 Sheets-Sheet 1

Inventor.
Sherman W. Cady,
By W. P. Doolittle
Atty.

Inventor
Sherman W. Cady,
By J. P. Austin
Atty.

Patented Apr. 7, 1925.

1,533,059

UNITED STATES PATENT OFFICE.

SHERMAN W. CADY, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

TRACTION-ACTUATED LIFT MECHANISM.

Application filed June 19, 1924. Serial No. 720,896.

*To all whom it may concern:*

Be it known that I, SHERMAN W. CADY, a citizen of the United States, residing at Hamilton, in the county of Wentworth and Province of Ontario, Canada, have invented certain new and useful Improvements in Traction-Actuated Lift Mechanism, of which the following is a full, clear, and exact specification.

This invention relates to power lift devices for implements such as grain drills, cultivators, etc., in which the ground engaging tools may be lifted and lowered and given adjustment for depth.

The principal objects are to provide lift mechanism comprising few and simple parts that will permit the working depth of the tools to be varied without affecting the height to which they are raised when lifted, that remaining uniform irrespective of the depth adjustment. Also, to arrange the elements of the mechanism so that adjustment and control are facilitated and the device made particularly adaptable for employment with tractor propelled implements.

The novel organization and details of construction by which these objects are attained and in which the invention resides are hereinafter described in greater detail and claimed.

Referring to the drawings,—

Figure 2:
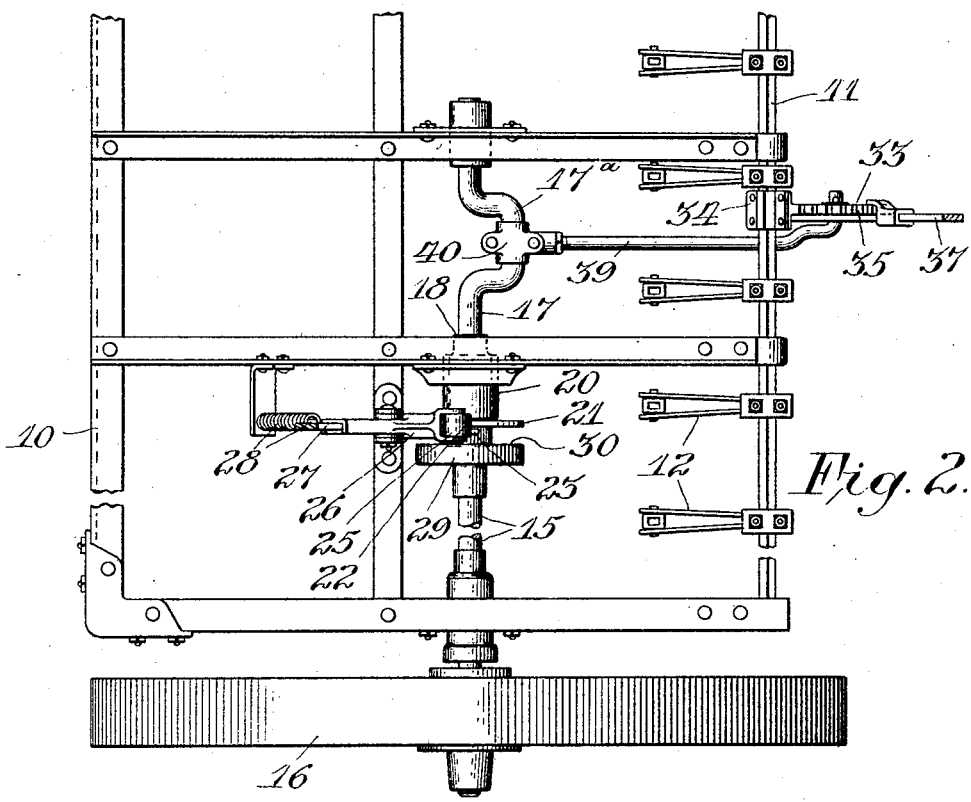
Fig. 2 is a plan view of one end of a grain drill embodying the invention.
Figure 4:
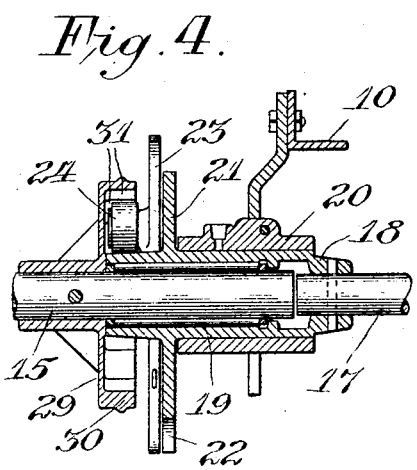
Fig. 4 is a detail sectional view through the parts constituting the intermittent clutch mechanism for operating the lift.
Figure 5:
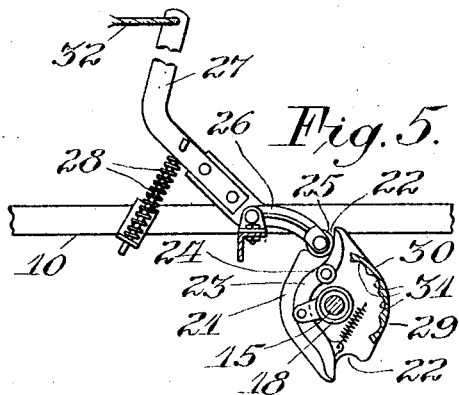
Fig. 5 is a detail view of the trip mechanism controlling the intermittent clutch.

In the accompanying drawings the invention has been illustrated as applied to a grain drill comprising a frame 10 on the rear of which there is journaled a rock-shaft 11, preferably consisting of two aligned sections, extending from end to end of the drill and having spaced arms 12 connected by spring pressed links 13 to the rear ends of the drag bars 14 supporting the furrow forming and seed dropping means. Beneath each end of the frame 10 and approximately in its transverse median line, there is journaled an axle 15 to which is fixed a transport wheel 16. As each lateral end of the grain drill is provided with the same axle and lift mechanism controlling one-half of the rock-shaft 11, it will be necessary to describe only one of the lift mechanisms, it being understood that they may be operated separately or simultaneously through separate or joint action of their trip elements. Journaled beneath the frame in alignment with the inner end of axle 15 is a crank shaft 17, one end of which has fixed thereto a bearing sleeve 18 (Fig. 4), which telescopes with the inner end of axle 15 and in which axle 15 turns on roller bearings 19. Sleeve 18 is in turn journaled in a bearing bracket 20 secured to the frame. The sleeve 18 is formed with an integral radially extending disk 21 provided with diametrically opposed trip receiving notches 22 (Fig. 5) and this disk has pivotally mounted thereon a pawl 23 carrying an engaging roller 24 on one side formed with oppositely extending ends projecting adjacent the notches 22 and adapted to be engaged by a trip roller 25 mounted on the arm 26 of a trip lever 27 pivoted on one of the frame members adjacent the clutch mechanism, as seen in Fig. 2. The trip lever 27 is normally pressed in a direction to cause roller 25 to engage notches 22 by means of a slip rod and compression spring 28 engaging lever 27 and a suitable abutment on the frame.

On axle 15 there is secured a complemental clutch disk 29 having a peripheral flange 30 which overhangs roller 24 of the pawl 23. This flange is provided with internal notches 31 adapted to receive the roller 24 and interlock the complemental clutch elements 29 and 21. The clutch mechanism just described is essentially like those of the prior art in which intermittent half revolutions are transmitted from a constantly rotating member to an intermittently rotated member, and, in this instance, it will be understood that a pull on trip lever 27 through the pull rope 32 extending forwardly to the tractor will lift trip roller 25 out of a notch 22 causing pawl 23 to interlock the clutch elements, thereby forcing shaft 17 and sleeve 18 to rotate with axle 15. Upon release of the trip lever 27, roller 25 will ride on the edge of disk 21 until the opposite notch 22 reaches the roller 25, when the pawl 23 is engaged and the clutch elements disconnected. Crank-shaft 17 is accordingly adapted to receive intermittent rotation through an arc of substantially 180 degrees from the axle 15 and traction wheel through the clutch mechanism described.

Figure 3:
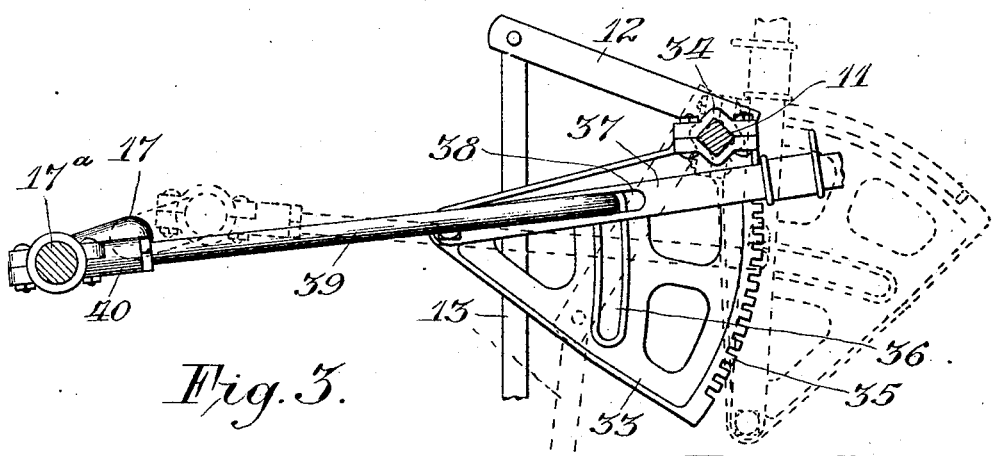
Fig. 3 is an enlarged detail view of the principal parts constituting the lift.

At a point on rock-shaft 11 approximately opposite the crank 17ª on crank-shaft 17, there is secured a radially extending rack member or plate 33. This member is preferably triangular in form, as shown in Fig. 3, and is fixed at one edge and inner one corner or angle to the rock-shaft by means of a suitable clamp 34. The upper edge, which constitutes the base of the triangular plate 33, is provided with an arcuate series of rack teeth 35 and at approximately its middle a plate is provided with a transverse arcuate slot 36. At the lower end, or apex, of the plate 33 on the center of the arc of the rack teeth 35 there is pivoted a hand lever 37 which extends upwardly across slot 36 and beyond the upper edge of the plate and is provided with the usual latch mechanism for adjustably locking the lever along the rack teeth 35. At a point opposite the slot 36 the lever 37 is provided with an elongated aperture or slot 38 extending at right angles to slot 36. The slots 36 and 38 serve to receive the outer angularly extended end of a link or pitman 39, the inner end of which is pivoted on the crank 17ª by means of the bearing sleeve 40. The swing of crank 17ª on each half revolution is from front to rear of the axis of shaft 17, as indicated in dotted lines on Figs. 1 and 3, thereby causing the link 39 to be moved or reciprocated in a general horizontal direction, causing plate 33 to be rocked with shaft 11 to the extent shown by the dotted outlines in said figures. Rocking of shaft 11 will, of course, cause arms 12 to swing vertically, resulting in raising and lowering of the drag bars 14, as will be obvious.

Figure 1:
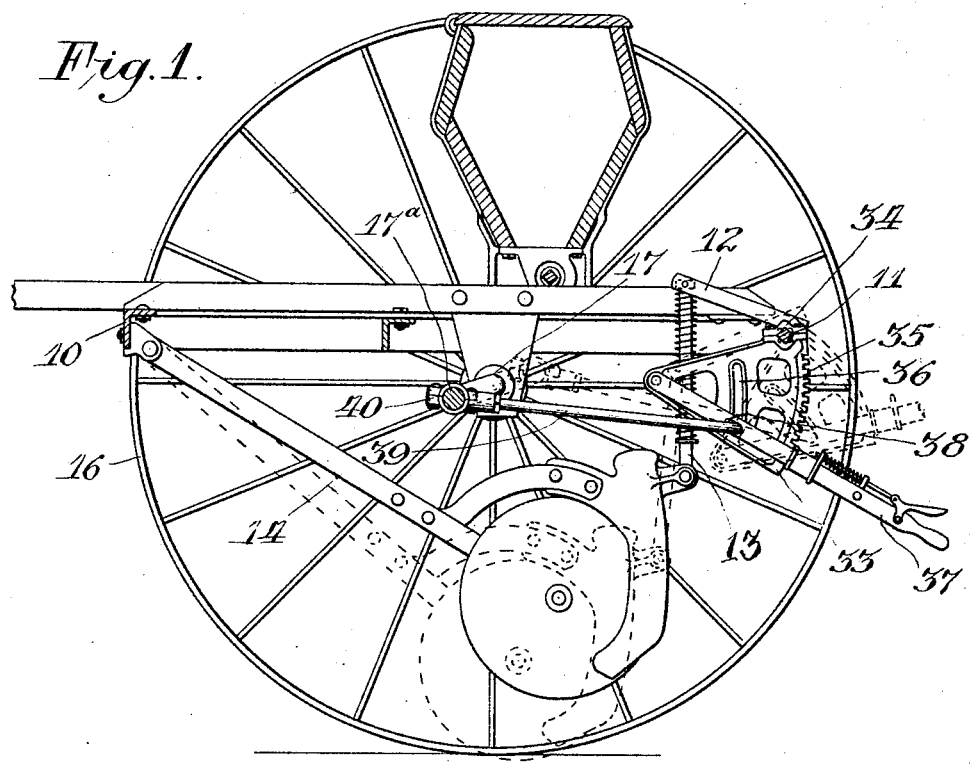
Fig. 1 is a sectional side elevation showing the novel lift mechanism applied to a grain drill.

The important feature to be noted is that the relation of plate 33 to crank 17ª is such that when the crank is in its forward position and the drag bars are raised, as in Figs. 1 and 3, the arc of the slot 36 will always be centered on the axis of pivotal movement of link 39 on crank 17ª, or nearly so. Therefore, when the drag bars are in raised position, the hand lever 37 may be adjusted along rack 35 to shift link 39 to any point along slot 36 without affecting or moving plate 33 and rock-shaft 11, the aperture 38 in lever 37 permitting necessary sliding movement between the lever and the link 39 to make this possible. The position of link 39 along slot 36, as determined by adjustment of lever 37, will, however, affect the depth to which the tools carried on drag bars 14 will be lowered or pressed when the plate 33 and rock-shaft are swung by the clutch mechanism in the lowering direction. If link 39 is in the lower or rear end of the slot, as in Fig. 1, the throw of crank 17ª will transmit the minimum amount of angular movement to plate 33, as the end of link 39 will then be at its furthest possible distance from the axis of shaft 11, which is also the axis of oscillation of the plate. As lever 37 is adjusted towards rock-shaft 11, thereby bringing the end of link 39 nearer the axis of oscillation of plate 33, the throw of crank 17ª will impart a greater extent of angular movement to plate 33 until the upper end of the slot is reached, as in Fig. 3, at which adjustment the greatest extent of angular movement, and, therefore, the greatest operating depth of the drag bars is obtained.

It is clear from the above description that a simple device of few parts and rugged construction is provided, having control elements conveniently located, which device is capable of permitting variation in the depth to which earth working tools can be forced into the soil while preserving the uniform height of lift desirable to clear obstructions on the ground, which might be struck by the tools during transport of the machine.

The specific embodiment of the invention herein described is obviously capable of certain modifications without departure from the gist of the invention as defined in the following claims.

What is claimed as new is:

1. In mechanism of the character described, the combination of a horizontal rock-shaft, a radially projecting member fixed thereon and formed with an arcuate guide track, a link having one end movable on the guide track, means pivoted to the other end of the link for reciprocating it in the direction of its length, the pivot of the link with said means being on the axis of the guide track in one position of said member, and an adjusting lever pivoted on said member for movement in the direction of the guide track and having a loose connection with the link.

2. In mechanism of the character described, the combination of a horizontal rock-shaft, a radially projecting plate fixed thereon and provided with an arcuate guide slot, a link having one end engaged in said slot, means pivoted to the other end of the link for reciprocating it in the direction of its length, the pivot of the link with said means being on the axis of the guide slot in one position of the plate, a lever pivoted to the plate below the arcuate slot and slidably engaged with the link, and means for adjusting the lever to shift the link along the slot.

3. In mechanism of the character described, the combination of a horizontal rock-shaft, a radially projecting plate fixed thereon and provided with an arcuate guide slot, a link having one end engaged in said slot, means pivoted to the other end of the link for reciprocating it in the direction of its length, the pivot of the link with said means being on the axis of the guide slot in one position of the plate, a lever pivoted to the plate below the arcuate slot and provided with an aperture through which the link passes, and latch mechanism on the lever cooperating with a rack on the plate located above the slot.

4. The combination with a seeding machine comprising a wheel supported frame, a rotatable axle, and furrow openers carried by the frame, of a rockably mounted rack plate mounted on the frame and provided with an arcuate guide slot, connecting means between the plate and the furrow openers, a crank shaft journaled on the frame in axial alignment with the axle, intermittent drive mechanism connecting the axle and crank shaft, a link pivoted to the crank and engaging the slot in the rack plate, and a hand lever pivoted on the plate and adjustable along its rack, said lever moving over the slot in the plate and having a slidable connection with the link, the relation between the crank and rack plate being such that the pivot of the link on the crank is on the axis of the arcuate slot in the plate when the furrow openers are raised.

5. The combination with a seeding machine comprising a wheel supported frame, a rotatable axle, and furrow openers having adjusting links connected to a rock-shaft mounted on the rear of the frame, of a rack plate secured at one edge to the under side of the rock-shaft and provided with an arcuate guide slot, a crank shaft journaled on the frame in axial alignment with the axle, intermittent drive mechanism connecting the axle and crank shaft, a hand lever pivoted to the plate below the slot therein and provided with a longitudinally extending elongated aperture opposite said slot, means for adjusting the lever in the direction of said slot, and a link pivoted to the crank and engaging the aperture in the lever and the slot in the rack plate, the relation between the crank and rack plate being such that the pivot of the link on the crank is on the axis of the arcuate slot in the plate when the furrow openers are raised.

In testimony whereof I affix my signature.

SHERMAN W. CADY.

Witnesses:
 EFFIE MACLEOD,
 GEORGE BROWN.